United States Patent [19]

Keith

[11] Patent Number: 4,763,983
[45] Date of Patent: Aug. 16, 1988

[54] OPTICAL TRANSMISSION CABLE WITH MESSENGER

[75] Inventor: P. Stephen Keith, Rougemont, N.C.

[73] Assignee: Sumitomo Electric Research Triangle, Inc., Research Triangle Park, N.C.

[21] Appl. No.: 947,993

[22] Filed: Dec. 31, 1986

[51] Int. Cl.$^4$ ............ G02B 6/44; H01B 3/00; B65H 69/02

[52] U.S. Cl. ............ 350/96.23; 350/96.10; 156/158; 174/70 A

[58] Field of Search ............ 350/96.23; 156/158, 156/172, 180, 244.12, 244.13, 244.22; 174/70 A

[56] References Cited

U.S. PATENT DOCUMENTS

| | | | |
|---|---|---|---|
| 3,207,836 | 9/1965 | Slechta | 174/70 A |
| 3,267,201 | 8/1966 | Pusey et al. | 174/70 A |
| 3,459,877 | 8/1969 | Bullock et al. | 174/36 |
| 3,498,826 | 3/1970 | Caroselli et al. | 117/72 |
| 3,532,783 | 10/1970 | Pusey et al. | 174/70 A |
| 3,674,761 | 7/1972 | Anspon et al. | 156/327 |
| 3,681,515 | 8/1972 | Mildner | 174/107 |
| 4,160,872 | 7/1979 | Lundberg et al. | 174/101.5 |
| 4,167,305 | 9/1979 | Ichiba et al. | 350/96.34 |
| 4,250,227 | 2/1981 | Claude et al. | 428/461 |
| 4,253,901 | 3/1981 | Aslakson | 156/327 |
| 4,378,462 | 3/1983 | Arnold, Jr. et al. | 174/70 A |
| 4,438,293 | 3/1984 | Voser | 174/70 A X |
| 4,444,817 | 4/1984 | Subramanian | 428/36 |

FOREIGN PATENT DOCUMENTS 1229787 8/1971 United Kingdom ............ 174/70 A

Primary Examiner—William L. Sikes
Assistant Examiner—Akm E. Ullah
Attorney, Agent, or Firm—Richard E. Jenkins

[57] ABSTRACT

An optical transmission cable with messenger being of an all-dielectric construction particularly suitable for use in aerial optical communication applications and comprising a figure-eight optical transmission cable with a messenger having a fiber reinforced plastic rod bonded to a polyethylene jacket with an adhesive layer of ethylene acrylic acid in order to prevent relative movement between the messenger rod and the polyethylene jacket.

9 Claims, 3 Drawing Sheets

OPTICAL TRANSMISSION CABLE WITH MESSENGER

TECHNICAL FIELD

The present invention relates to an improved optical transmission cable and, more particularly, it relates to an optical transmission cable of the type incorporating a supporting messenger of an improved bonded construction wherein the supporting messenger is formed of a fiber reinforced plastic to which a polyethylene jacket is adhesively bonded by ethylene acrylic acid.

DESCRIPTION OF THE PRIOR ART

Conventional communication cables with supporting messengers are known in the electrical conducting cable art. Particularly, it is known in the prior art to provide a figure-eight type copper telephone cable construction wherein a galvanized steel wire messenger is bonded to a polyethylene jacket with ethylene acrylic acid. Also, it is known in conventional figure-eight cable constructions to bond a galvanized steel messenger wire to a surrounding jacket by applying a layer of a maleic modified, high density polyethylene directly to the support wire to serve as a bonding layer for the outer polyethylene jacket. The conventional figure-eight cable constructions have provided the necessary mechanical coupling of the supporting messenger wire to the jacket in order to prevent tearing and slipping of the jacket from the messenger wire when the cable is blown about by the wind. It is believed that conventional stranded steel messenger wire coupling or bonding occurs through the adhesion between the messenger wire jacket and the asphaltic compound in the messenger wire and the mechanical coupling or bonding between the messenger wire jacket and the interstices of the messenger wire.

An all-dielectric optical transmission cable is desirable since it can be utilized in aerial applications in proximity to existing high voltage lines without the induced voltage problem which would be presented if the cable utilized a messenger with a metallic wire. Therefore, attempts have been made to construct an all-dielectric figure-eight type cable with a supporting messenger, but the aforementioned mechanisms do not serve to bond the messenger wire and a surrounding jacket when an all-dielectric construction is utilized (such as a smooth fiber reinforced plastic messenger rod surrounded by a polyethylene jacket). In this particular construction, both the polyethylene and the fiber reinforced plastic tend to resist bonding due to their respective surface inert characteristic. Therefore, the need for an all-dielectric figure-eight optical transmission cable continues to exist but all known efforts have resulted in shortcomings including a failure of the dielectric messenger strength member to properly bond to a protective polyethylene jacket.

DISCLOSURE OF THE INVENTION

In accordance with the present invention, applicant provides an all-dielectric figure-eight optical transmission cable with a supporting messenger comprising a fiber reinforced plastic rod which is adhesively bonded to a surrounding polyethylene jacket by a layer of ethylene acrylic acid provided therebetween in order to prevent relative movement between the messenger rod and polyethylene jacket. The optical transmission cable associated with the messenger may be of any suitable conventional construction including a tight buffer layered cable or a loose tube construction.

It is therefore the object of this invention to provide an all-dielectric figure-eight type optical transmission cable embodying a jacketed messenger comprising a fiber reinforced plastic rod bonded to a polyethylene jacket with an adhesive layer of ethylene acrylic acid so as to prevent any relative movement between the rod and the polyethylene jacket.

Another object of the present invention is to provide an improved dielectric cable construction wherein a fiber reinforced plastic rod may be satisfactorily bonded to a surrounding polyethylene jacket with ethylene acrylic acid despite the surface inert characteristic of both elements of the cable.

Some of the objects of the invention having been stated, other objects will become evident as the description proceeds, when taken in connection with the accompanying drawings.

BEST MODE FOR CARRYING OUT THE INVENTION

Figure 1:
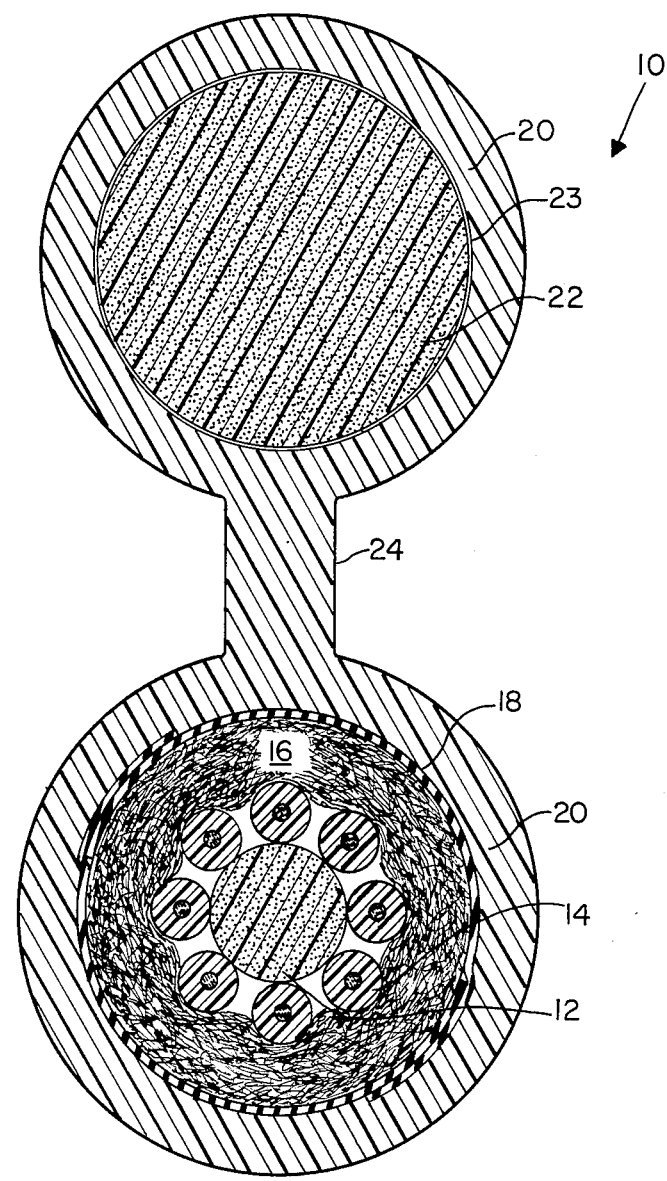
FIG. 1 is a transverse sectional view through the optical transmission cable with messenger of the present invention.
Figure 2:
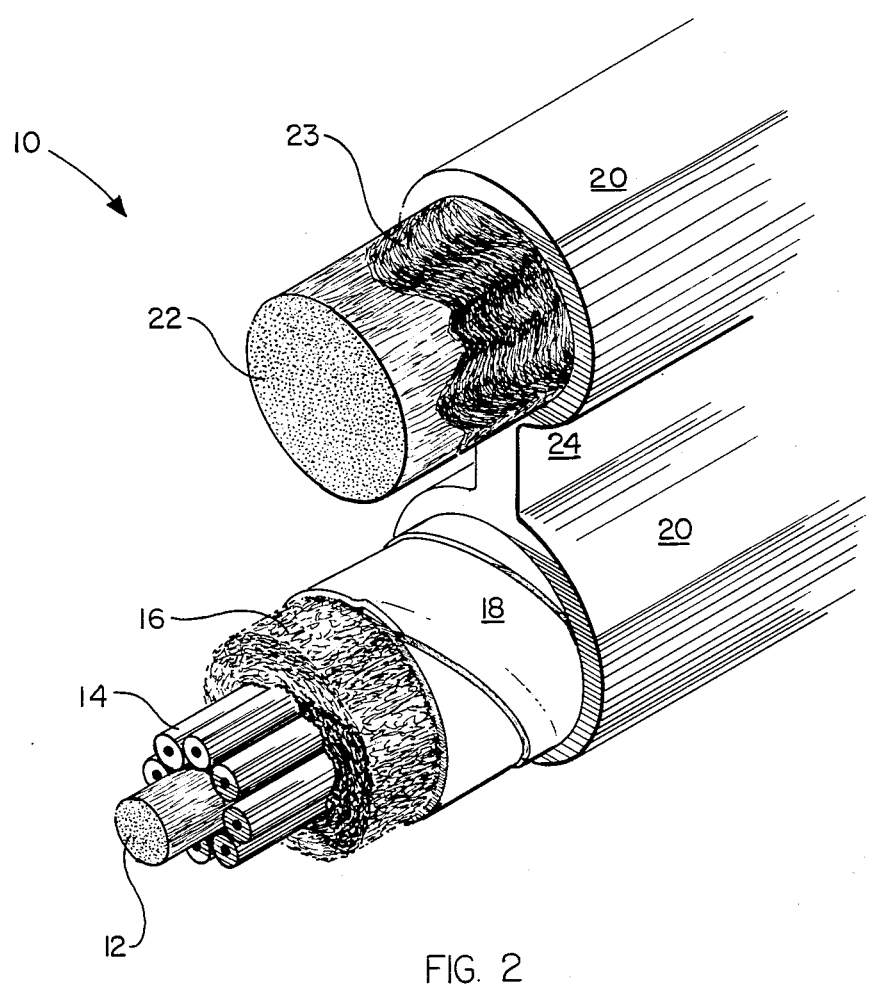
FIG. 2 is a fragmentary view in perspective, partially broken away, to illustrate the various elements of the invention.

Referring now more specifically to the drawings, FIGS. 1 and 2 depict the optical transmission cable with messenger of the invention indicated generally by the numeral 10. Cable 10 can be seen to consist of a conventional tight buffer layered cable construction, although other conventional constructions such as a loose tube construction may be utilized. As illustrated in FIG. 1, the tight buffer layered cable comprises a fiber reinforced plastic central member 12 surrounded by nylon-coated optical fibers 14. In order to cushion optical fibers 14, a soft fibrillated polypropylene yarn layer 16 is provided around optical fibers 14. For better containment and protection of optical fibers 14, a rubber tape 18 is wrapped over cushion yarn layer 16. Finally, rubber tape 18 is covered by a polyethylene jacket 20.

Located above and connected to the optical transmission cable is a support messenger comprising a fiber reinforced plastic rod 22 which is bonded to polyethylene jacket 20 by ethylene acrylic acid layer 23. Jacket 20 further forms an integral, intervening web 24 between the messenger and the optical transmission cable. As will be apparent, the optical transmission cable construction beneath web 24 is conventional. However, the construction of the support messenger thereabove is believed to be novel and to provide for an all-dielectric figure-eight optical transmission cable which has not heretofore been possible. An all-dielectric optical transmission cable is attractive to, among others, electrical power companies since it can be strung-up in conjunction with existing line structures without induced voltage problems inherent in a cable with a metallic messenger wire.

The utilization of ethylene acrylic acid layer 23 to bond the inert surfaces of the fiber reinforced plastic messenger rod 22 to polyethylene jacket 20 is believed by applicant to provide a new improved strength member which can be used as the messenger for a figure-eight optical transmission cable. Although the method of bonding messenger rod 22 to polyethylene jacket 20 is largely a matter of choice, it can be accomplished in at least two ways. First of all, ethylene acrylic acid layer 23 can be applied by extrusion or solution over fiber reinforced plastic rod 22 and then polyethylene jacket 20 extruded over ethylene acrylic acid layer 23 in order to achieve the desired bonding of the two elements. The bonding may also be accomplished by first applying ethylene acrylic acid layer 23 to fiber reinforced plastic rod 22, applying a thin pre-coat of polyethylene thereon and, in a separate operation, polyethylene jacket 20 is applied or extruded over the pre-coat of polyethylene. It will be appreciated by those skilled in the art that the second layer of polyethylene which serves to form jacket 20 will be heat-fused to the pre-coat of polyethylene. Although many messenger constructions are possible, rod 22 may have a diameter of about 5.0–10.0 mm (millimeters) and jacket 20 a thickness of about 1.0–2.0 mm in a typical cable 10.

Figure 3:
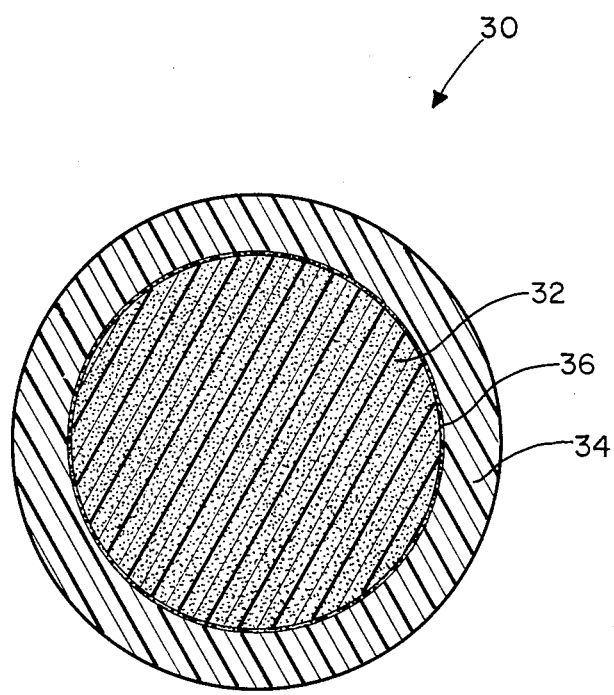
FIG. 3 is a transverse sectional view through a jacketed fiber reinforced plastic rod constructed in accordance with the present invention.

A second embodiment of the invention is depicted in FIG. 3 and broadly comprises a bonded high strength rod, generally designated 30. High strength rod 30 includes a fiber reinforced plastic core 32 which is bonded to polyethylene jacket 34 by ethylene acrylic acid layer 36. This particular construction is believed to be new since the bonding of fiber reinforced plastic to polyethylene is known to cause problems in view of the fact that the surfaces of both materials are inert. In fact, the non-bonding of fiber reinforced plastic to polyethylene is a fairly well recognized phenomenon. Ethylene acrylic acid layer 36 serves as an adhesive interface since it has a definite affinity for polyethylene as illustrated by its prior use as the polymer in plastic-coated metal tapes for the telecommunications cable industry.

It should be understood that for both embodiments of the present invention described hereinbefore the polyethylene layer which is bonded to the underlying fiber reinforced plastic rod by ethylene acrylic acid is a low density polyethylene, although other densities could be utilized as a matter of design choice.

Although the high strength, all-dielectric rod 30 illustrated in FIG. 3 can be used as the messenger in an all-dielectric figure-eight optical transmission cable as illustrated in FIGS. 1 and 2, it will be appreciated that it also would have other applications in view of the fact that the jacketed core 32 has been bonded in a manner which renders it capable of being loaded to the rated breaking strength of rod 30 without slippage between jacket 34 and fiber reinforced plastic core 32. Moreover, the bond between the elements is also heat stable in order to facilitate certain aerial applications. Possible applications of rod 30 in addition to the figure-eight construction illustrated in FIG. 1 include use of rod 30 as the central strength member of an optical transmission cable. Also, rod 30 may be used as the messenger in an all-dielectric optical transmission cable utilizing the conventional lashing method of aerial installation. Other applications of rod 30 are clearly contemplated by the instant invention.

The bonded rod of FIG. 3 has been tested and the results are set forth in the tables below for better understanding of the invention. For the tests, the rod was constructed from a fiber reinforced plastic rod of 1.75 mm diameter which was initially pre-coated with low density polyethylene to a total diameter of 2.28 mm. Next, a jacket thickness of 1.3 mm was extruded thereover for an approximate total diameter of 4.85 mm. The jacket compound was UNION CARBIDE DFDA 0588 and application thereof was by pressure extrusion at a maximum temperature of 420 degrees Fahrenheit which was sufficient to melt the second polyethylene jacket into the first pre-coat jacket.

A control sample was produced using, for convenience, a 2.05 mm fiber reinforced plastic rod pressure extruded with a UNION CARBIDE DFDA 0588 polyethylene jacket, without an adhesive layer of ethylene acrylic acid between the rod and jacket, to an outside diameter of 4.85 mm. The 1.75 mm fiber reinforced plastic rod had a break strength of 401 kg and the 2.05 mm rod was rated at a break strength of 535 kg. The control sample was believed to be valid, however, because a comparison of ultimate tensile strengths was not of interest. The testing criteria established for the tests were:

(1) Whether a sample can be stressed in Kellums grips to its rated breaking load, or within 90 percent thereof, without jacket slippage;
(2) Whether a sample can be heat-aged, simulating long-term aerial exposure, and still maintain its bond; and
(3) Whether there would be any buckling, slipping, or tearing of the jacket significantly below the rated strength of the sample.

All samples were tested with Model 033-29-1000 Kellums grips with loading by an Instron tensile machine, and load versus crosshead displacement was charted. The results are set forth in Tables 1–4 below.

TABLE 1

| Bonded Samples, No Aging | | | | | |
|---|---|---|---|---|---|
| Test Speed mm/min | Peak Load, kg | Break Load, kg | Failure Mode | Jacket Performance | Modulus kg/mm |
| 5 | 414.2 | At peak | At top grip | No slipping, etc. | 1660 |
| 10 | 429.7 | At peak | At top grip | No slipping, etc. | 1540 |
| 15 | 390.2 | At peak | Break approximate 40 mm into gauge length (g.l.) from top grip | No slipping, etc. | 1660 |
| 20 | 381.6 | At peak | At top grip | No slipping, etc. | 1590 |

TABLE 2

| Bonded Samples, Aged 80 Degrees Centigrade for 168 Hours | | | | |
|---|---|---|---|---|
| Peak Load, kg | Break Load, kg | * Failure Mode | Jacket Performance | Modulus kg/mm |
| 453.8 | At peak | 140 mm into g.l. | No slipping, etc. | 1550 |
| 453.7 | At peak | 30 mm into g.l. | No slipping, etc. | 3000 |
| 407.5 | At peak | Top grip | No slipping, etc. | 1455 |

TABLE 3

Bonded Samples, Aged 100 Degrees Centigrade for 48 Hours

| Peak Load, kg | Break Load, kg | Failure Mode | Jacket Performance | Modulus kg/mm |
|---|---|---|---|---|
| 427.2 | At peak | 114 mm into g.l. | No slipping, etc. | 1415 |
| 437.9 | At peak | 150 mm into g.l. | No slipping, etc. | 1330 |
| 425.5 | At peak | Top grip | No slipping, etc. | 1375 |

TABLE 4

Control Samples, No Bond

| Sample | Peak Load, kg | Break Load, kg | Failure Mode | Jacket Performance | Modulus kg/mm |
|---|---|---|---|---|---|
| 1 | 323.9 | * | *Did not break - failed to hold load | Slipped over rod end | 545 |
| 2 | 377.9 | 362.3 | After slipping, broke 100 mm into g.l. | Slipped over rod end | 545 |
| 3 | 372.2 | 368.7 | After slipping, broke 12 mm into g.l. | Slipped over rod end | 575 |

As can be seen in the results of Tables 1–4 above, the bonded samples exhibit a peak load equal to the breaking load, which is consistant with the observation that no jacket slippage occurred. The improvement in tensile performance of the bonded samples after thermal aging indicates stability at these temperatures. Also of interest, the Young's Modulus of the unbonded control samples averaged only about 35 percent of that of the bonded rod. Since it is the modulus value rather than the ultimate break strength that will normally be the limiting parameter in establishing span lengths for aerial optical transmission cables, this is quite suggestive of the suitability of the present invention for aerial applications.

It will thus be seen that there has been described above an improved all-dielectric bonded jacketed rod construction particularly suited for use as the messenger in a figure-eight optical transmission cable.

It will be understood that various details of the invention may be changed without departing from the scope of the invention. Furthermore, the foregoing description is for the purpose of illustration only, and not for the purpose of limitation—the invention being defined by the claims.

What is claimed is:

1. An optical transmission fiber cable of the type having at least one optical transmission fiber and a supporting messenger attached thereto, the improvement comprising a messenger having a fiber reinforced plastic rod, and a polyethylene jacket bonded to said fiber reinforced plastic rod with an adhesive layer of ethylene acrylic acid provided therebetween, thereby preventing relative movement between the messenger rod and polyethylene jacket.

2. An optical transmission fiber cable according to claim 1 wherein said polyethylene jacket envelopes both said at least one optical transmission fiber and said fiber reinforced plastic messenger rod and comprises a low-density polyethylene.

3. An optical transmission fiber cable according to claim 2 wherein said polyethylene jacket has a thickness of about 1.0–2.0 mm and said fiber reinforced plastic messenger rod has a diameter of about 5.00–10.00 mm.

4. A bonded strength member comprising a longitudinally extending fiber reinforced plastic core, and a polyethylene jacket enveloping said core and being adhesively bonded thereto by a layer of ethylene acrylic acid extending over substantially the entire peripheral surface of said fiber reinforced plastic core, thereby preventing relative movement between the core and the jacket.

5. A bonded strength member according to claim 4 wherein said polyethylene jacket comprises low density polyethylene and the interfacing surfaces of said core and said jacket are inert.

6. An optical transmission fiber cable of the type having at least one optical transmission fiber and a supporting messenger attached thereto, said at least one optical transmission fiber comprising a tight buffer layered cable having a longitudinally extending central support member surrounded by a plurality of optical fibers, the improvement comprising a messenger having a fiber reinforced plastic rod, and a polyethylene jacket bonded to said fiber reinforced plastic rod with an adhesive layer of ethylene acrylic acid provided therebetween, thereby preventing relative movement between the messenger rod and polyethylene jacket.

7. An optical transmission fiber cable of the type having at least one optical transmission fiber and a supporting messenger attached thereto, said at least one optical transmission fiber comprising a plurality of generally longitudinally extending loose tubes each containing a plurality of optical transmission fibers, the improvement comprising a messenger having a fiber reinforced plastic rod, and a polyethylene jacket bonded to said fiber reinforced plastic rod with an adhesive layer of ethylene acrylic acid provided therebetween, thereby preventing relative movement between the messenger rod and polyethylene jacket.

8. An optical transmission fiber cable of the type having at least one optical transmission fiber and a supporting messenger attached thereto, the improvement comprising a messenger having a fiber reinforced plastic rod, and a polyethylene jacket bonded to said fiber reinforced plastic rod with an adhesive layer of ethylene acrylic acid provided therebetween, thereby preventing relative movement between the messenger rod and polyethylene jacket, said polyethylene jacket comprising a first relatively thin pre-coat layer which is bonded to said fiber reinforced plastic rod by said adhesive layer of ethylene acrylic acid, and a second relatively thicker layer of polyethylene which is bonded to said first pre-coat layer of polyethylene.

9. A bonded strength member comprising a longitudinally extending fiber reinforced plastic core, and a polyethylene jacket enveloping said core and being adhesively bonded thereto by a layer of ethylene acrylic acid extending over substantially the entire peripheral surface of said fiber reinforced plastic core, thereby preventing relative movement between the core and the jacket, said polyethylene jacket comprising a relatively thin pre-coat layer which is bonded to said fiber reinforced plastic core by said adhesive layer of ethylene acrylic acid, and a second relatively thicker layer of polyethylene which is bonded to said first pre-coat layer.

* * * * *

Disclaimer and Dedication 4,763,983.—*P. Stephen Keith*, Rougemont, N. C. OPTICAL TRANSMISSION CABLE WITH MESSENGER. Patent dated Aug. 16, 1988. Disclaimer and Dedication filed Apr. 10, 1989, by the assignee, Sumitomo Electric Fiber Optics Corp.

Hereby disclaims and dedicates to the Public claims 4, 5 and 9 of said patent.
[*Official Gazette October 31,1989* ]